INVENTOR.
ILMAR G. RAUDSEP
BY Bruce C Lutz
ATTORNEY

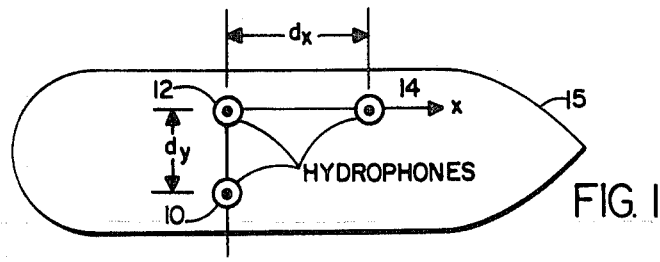
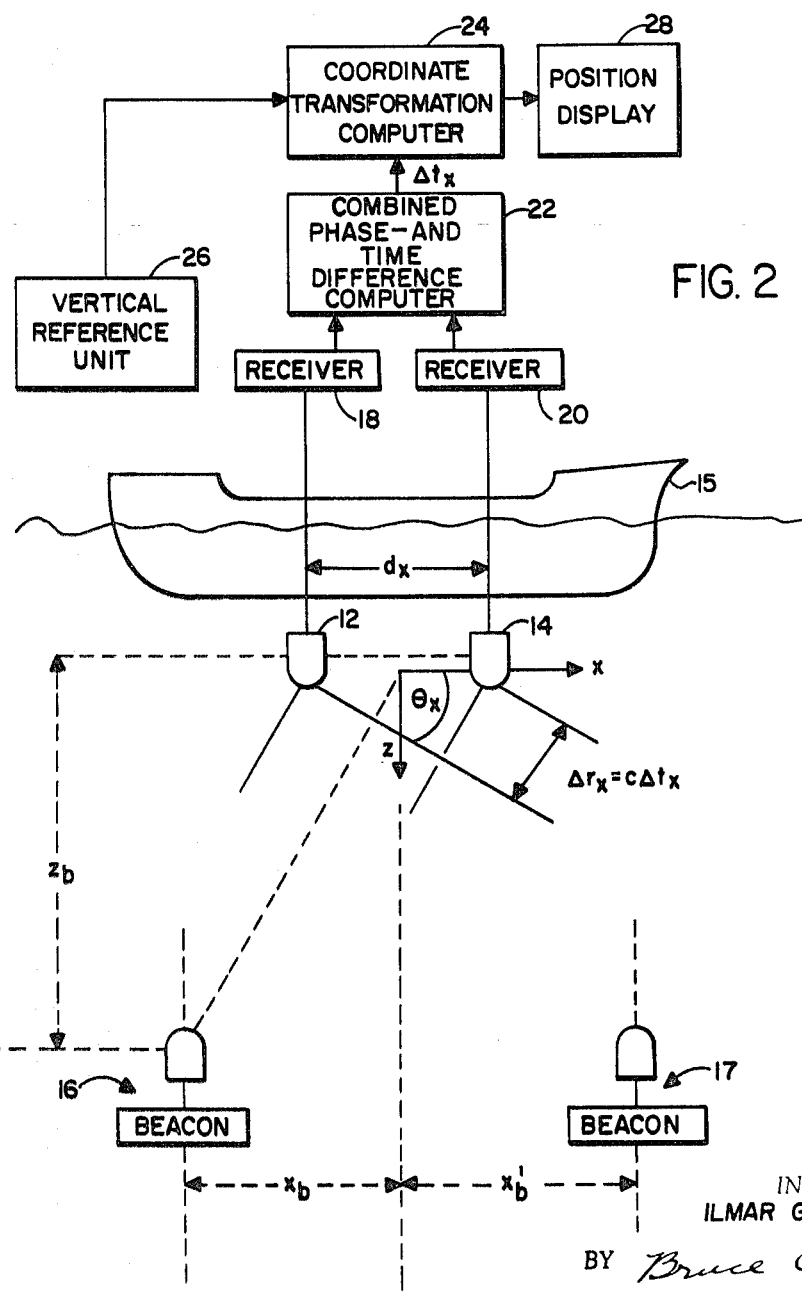

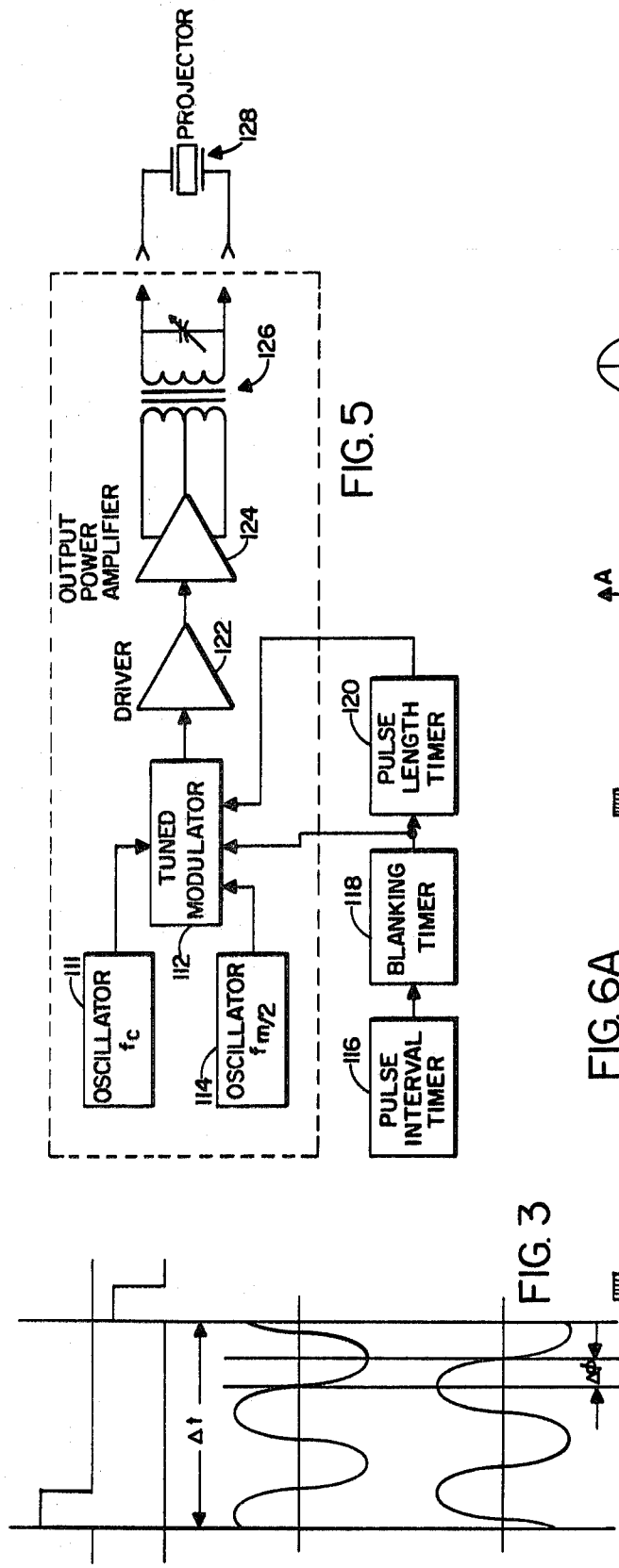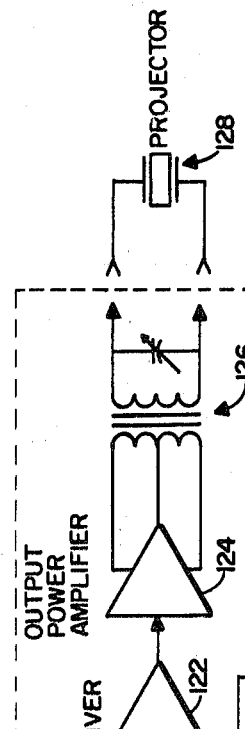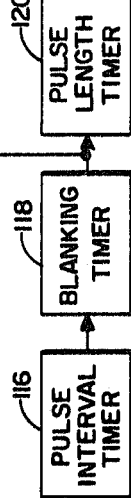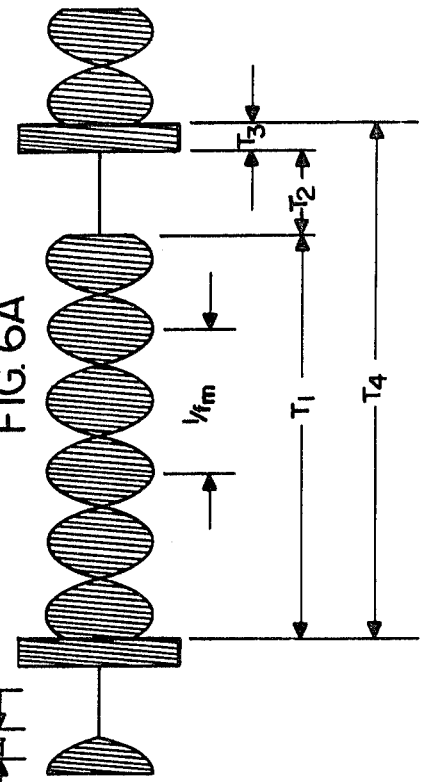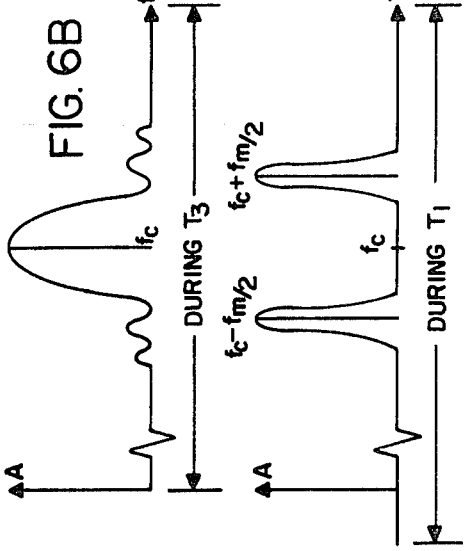

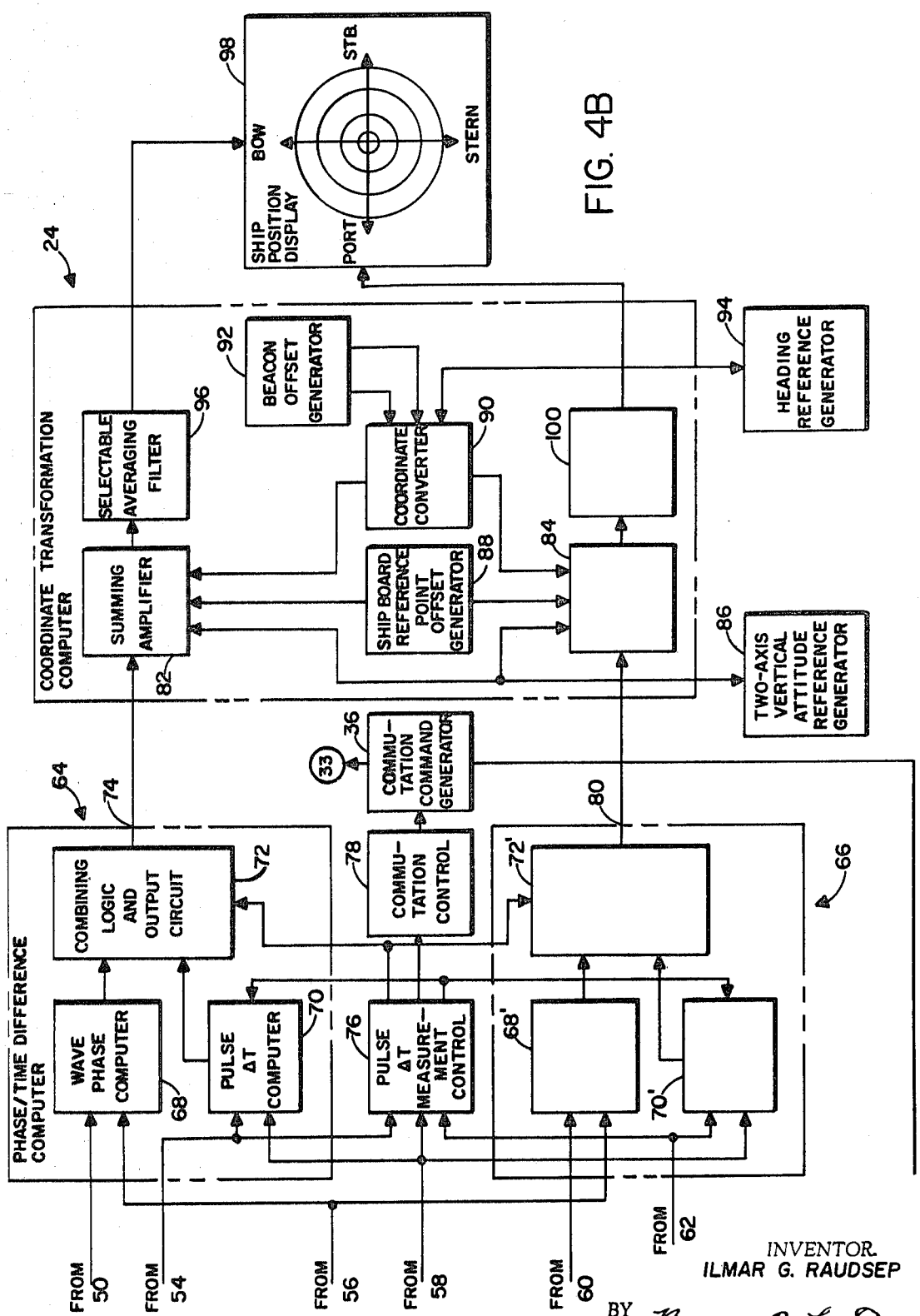

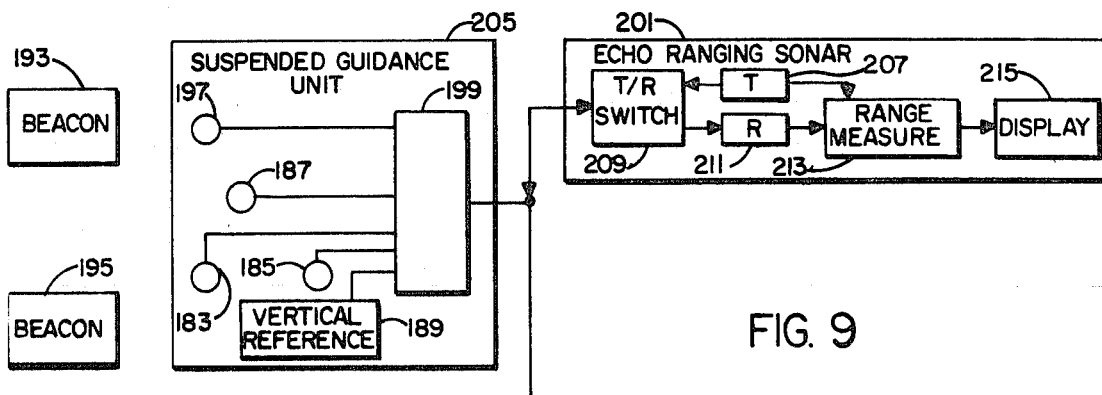
FIG. 9
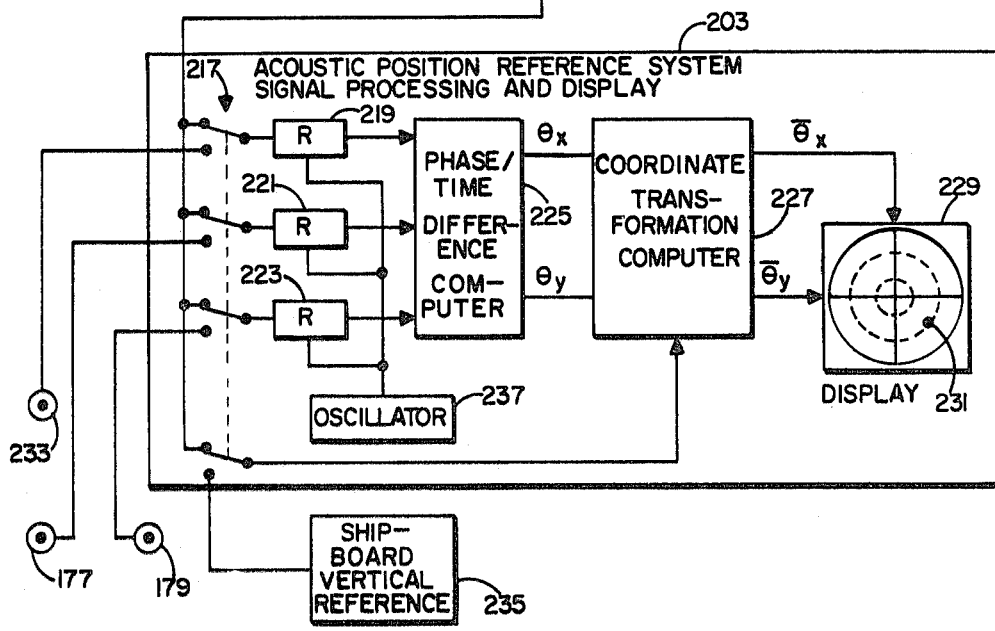
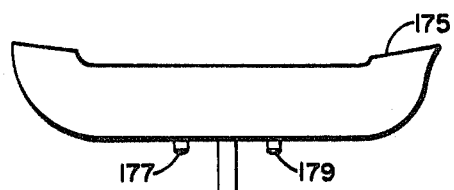
FIG. 8
INVENTOR.
ILMAR G. RAUDSEP
BY Bruce C Lutz
ATTORNEY

United States Patent Office 3,559,161
Patented Jan. 26, 1971

3,559,161
ACOUSTIC POSITION REFERENCE SYSTEM
Ilmar G. Raudsep, Seattle, Wash., assignor to Honeywell Inc., Minneapolis, Minn., a corporation of Delaware
Continuation-in-part of application Ser. No. 655,662, July 24, 1967. This application June 28, 1968, Ser. No. 741,191
Int. Cl. G01s *3/00, 5/18*
U.S. Cl. 340—6
9 Claims

ABSTRACT OF THE DISCLOSURE

An acoustic position finding system comprising at least one underwater beacon, an array of spaced hydrophones, and signal processing equipment. The beacon periodically transmits a signal having pulse and wave components in which the period of the wave component is substantially shorter than the interval between pulses. The processing equipment computes the position of the array relative to the beacon from time and phase differences in signals received by individual hydrophones in the array.

THE INVENTION

This application is a continuation-in-part of a previous application in the name of the same inventor, Ser. No. 655,662, filed July 24, 1967 entitled Control Apparatus, assigned to the same assignee as the present invention and now abandoned.

The present invention relates generally to direction finding equipment and more specifically to a system for determining the position of an underwater signal transmitting beacon with respect to an array of receiving transducers or hydrophones. Alternate embodiments use more than one beacon, any or all of which may be movable. The output provides information as to where the beacons are situated with respect to each other and/or with respect to the array which may be mounted on underwater apparatus or on a surface vessel.

While prior art direction finding systems are known, none of the prior art systems combine the versatility and accuracy of the present unit into one package. The present unit requires the use of only three hydrophones to obtain the direction information. This information is fed through three receivers which are commutated so that errors introduced by the receivers are averaged out to zero. The outputs of the receivers are supplied through phase/time difference computers to a coordinate transformation computer which actuates a display. The phase/time difference computers utilize both phase and time information to obtain high accuracy.

The beacon or other sound source provides as an output signal one which is divided into components of high periodicity and low periodicity. The present embodiment utilizes successive periods of modulation for the high periodicity component, each period followed by a pulse and an unmodulated period for the low periodicity component. The receiving circuitry is constructed such that it detects the modulation signal and deactivates time measurement circuitry in the phase/time computers until immediately prior to the unmodulated signal at which time the time or pulse circuitry is activated to receive the pulse information. It is then again deactivated so that the circuitry is not actuated as to pulse or time information by erroneous or stray signals.

Relating this invention to a specific field of application, it will be noted that in the field of ocean exploration and exploitation, there are many instances wherein precise relative location of vessels, submersibles and bottom structures is necessary. In off shore oil drilling operations using floating platforms, it is necessary to determine the position of a drilling rig with respect to a wellhead so that the drilling rig may be appropriately positioned. It may also be necessary to guide a diver to the wellhead or other bottom structure or to guide a submersible performing search or inspection cruises. The invention described herein in its several forms is capable of performing the tasks cited with a very high degree of precision.

There are also many instances where mating of two devices is desired. One of these situations is in conjunction with the above-mentioned oil drilling operation wherein it is desired to introduce drilling equipment or a drill string into a previously established wellhead. While it is necessary that the ship be maintained substantially over the wellhead, the mere lowering of the drill string will not necessarily result in mating between the wellhead and the drill string. In fact, the probability of mating is extremely low. Therefore, it is necessary to have a hydhophone array attached to the drill string being lowered so that the ship or the drill string or both can be moved to precisely situate the lower end of the drill string with respect to the wellhead. The apparatus as shown can also be used to position caissons or other objects which are at remote locations especially where the environment is such it is impractical to use human beings to directly observe and position the apparatus for mating.

It is therefore an object of this invention to provide improved direction finding and relative position indicating apparatus.

Other objects and advantages of this invention will be apparent from a reading of the specification and claims in conjunction with the drawings wherein:

FIG. 1 is an illustration of the relative placement of the hydrophones;

FIG. 2 is a block diagram of the overall system configuration for one angle of measurement;

FIG. 3 is an illustration of the time and phase difference measurement wave forms;

Figure 4A:
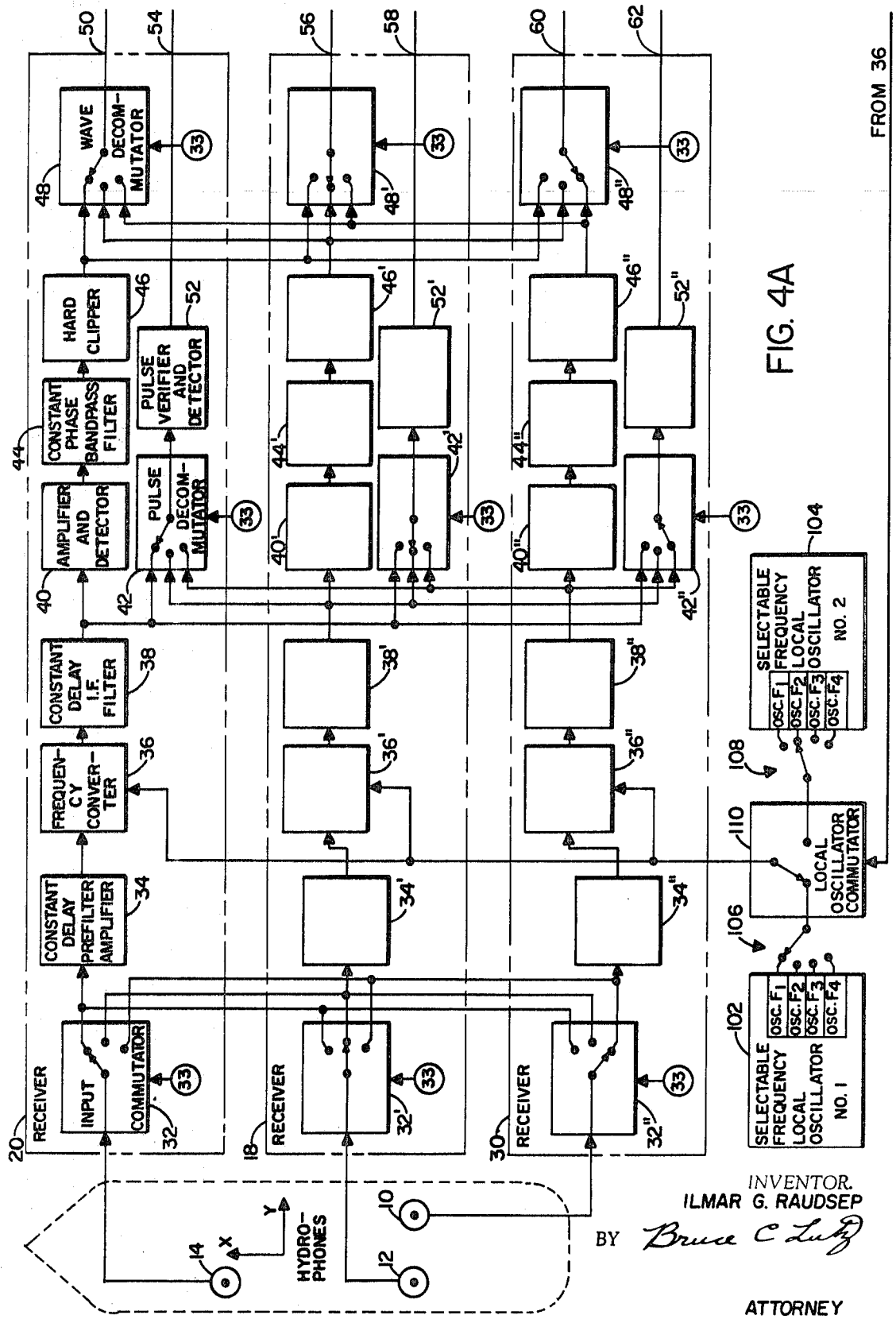
Figure 7:
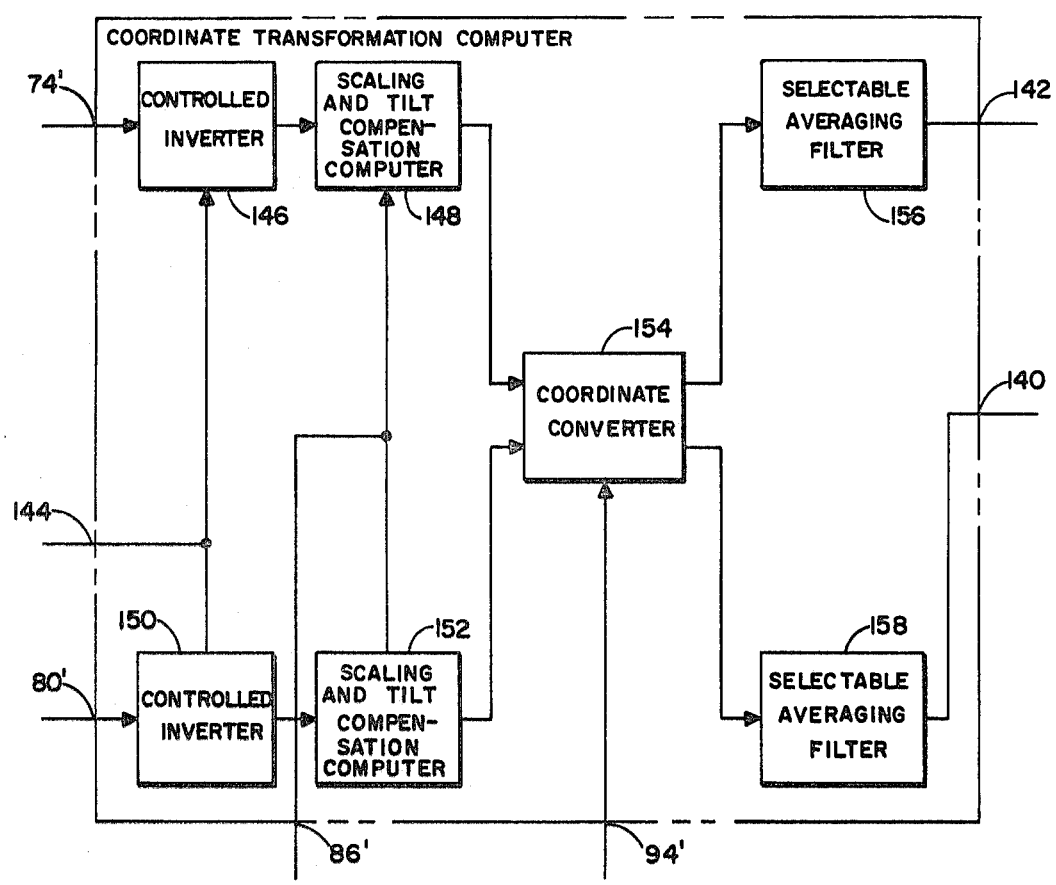

FIGS. 4A and 4B together show the overall block diagram of the shipboard or receiving system in more detailed form than is shown in FIG. 2;

FIG. 5 shows the block diagram for the beacon or transmitter electronics;

FIGS. 6A and 6B respectively show the output waveform of the signal transmitted from the beacon of FIG. 5 and the power spectrum thereof;

FIG. 7 shows the block diagram of a coordinate transformation computer for use in FIG. 4 when the apparatus is to be used with one or more movable beacons with respect to a fixed beacon;

FIG. 8 is an illustration of a ship having well drilling equipment situated there-below wherein an attempt is being made to re-enter a wellhead on the ocean floor; and FIG. 9 is a block diagram of an overall system for use either with hydrophones mounted on the ship or hydrophones mounted on the underwater apparatus.

DETAILED DESCRIPTION

FIG. 1 is merely a representation of a platform or vessel 15 showing the location of three hydrophones or transducers 10, 12, and 14. These three hydrophones are placed on three corners of the four corners of a rectangle in a preferred embodiment. While other configurations could be used, additional computations would have to be used in the output stage of the system for these configurations.

In FIG. 2 apparatus is shown for making an *x* axis determination of the angle from vertical of the platform relative to a beacon 16 in a coordinate system. The same general circuitry would be used for making the *y* angle determination. A further beacon 17 is shown for purposes of explanation of an alternate embodiment. Hydrophones 12 and 14 are shown attached to the platform 15 such as shown in FIG. 1. Receivers 18 and 20 are shown connected to hydrophones 12 and 14 respectively. The outputs of receivers 18 and 20 are supplied to a combined phase and time difference computer 22 whose output is supplied to a coordinate transformation computer 24. A vertical reference unit 26 also supplies an input to block 24. The output of computer 24 is supplied to a position display block 28. For the purposes of initial discussion with respect to FIG. 2, it will be assumed that the hydrophone mountings are stable with respect to a horizontal plane. This may be achieved either with a very large vessel which does not roll or pitch or a platform which is stabilized independently of movements of the ship.

In FIG. 3 waveforms are shown which, as will be explained later in connection with FIGS. 5 and 6, are waveforms of the pulse and wave outputs from beacon 16. The difference time, $\Delta t$, is the time between reception at hydrophone 12 and reception at hydrophone 14 of the pulses, and the same is true as regards $\Delta \phi$ which is the difference in phase reception at the hydrophones of the sine waveforms. As will be explained later, the pulse waveforms are utilized to obtain an approximate or coarse indication of time differential between receipt of signals between transducers 12 and 14 while the alternating waveforms are utilized in a phase detector to obtain a fine indication which, when used with the coarse indication, provides accurate information as to total time difference of receipt.

In FIGS. 4A and 4B the hydrophones or transducers 12 and 14 are again shown connected respectively to substantially identically constructed receivers 18 and 20, while transducer 10 is connected to a receiver 30. Where applicable, the blocks of FIG. 4 will be given the same designations as utilized in FIG. 2. An input to receiver 20 from hydrophone 14 is connected to an input commutator means 32 which has an input 33 from a commutation command generator 35. Generator 35 will be connected to the circuitry later and will merely be mentioned at the present time. The commutator 32 in the present embodiment can be thought of as merely a three position switch which is positioned in accordance with the input signal 33. There are three outputs from commutator 32 which are connected to similar outputs in similar commutators 32' and 32" in receivers 18 and 30 respectively.

The upper output of block 32, to which the commutator switch is connected, is connected to a constant delay prefilter and amplifier means block 34 and also to the upper output terminals of blocks 32' and 32" to form a set of connections. The middle output of block 32 is connected to the middle outputs of blocks 32' and 32" to form another set of connections which is also connected to the input of a block 34' and receiver 18. The bottom or lower output of block 32 is similarly connected to the outputs of the other two commutators to form a set which is connected to the input of a block 34" in receiver 30. An output of prefilter and amplifier 34 is connected through a frequency converter 36 to a constant delay IF filter 38. An output of IF filter 38 is supplied to an amplifier and detector 40 and also to an upper input of a plurality of pulse decommutators 42, 42' and 42". As will be realized, the identical blocks in receivers 18 and 30 have the same designation as that in receiver 20 and merely are prime or double prime as the case may be. Each of these blocks is identical and further recitations as to the connections in receivers 18 and 30 will not be provided.

The output of amplifier and detector 40 is fed through a constant phase band pass filter 44 to a hard clipper 46 and then to a wave decommutator 48. Each of the wave decommutators as well as pulse decommutators are connected such that similar multiple outputs or inputs are connected together. However, the decommutators or commutators in the various receivers are connected to receive inputs or provide outputs to different channels as will be later described. The wave decommutator 48 provides one of the outputs 50 for receiver 20 while the pulse decommutator 42 supplies a signal through a pulse verifier and detector 52 to provide a second output 54 for the receiver 20. Similar outputs are designated as 56 and 58 for receiver 18 and 60 and 62 for receiver 30.

Two phase/time difference computers or differential comparators 64 and 66 are shown as replacing the single unit designated as 22 in FIG. 2. A fine wave phase computer 68 provides phase detection and receives inputs from output terminals 50 and 56. A pulse $\Delta T$ computer 70 provides time detection and receives inputs from output terminals 54 and 58. Each of the blocks 68 and 70 provide an input to a combining logic and output circuit 72 which supplies an output at 74 for the block 64. Each of the similar blocks in computer 66 are designated the same, except for the addition of a prime designation, as in computer 64. As may be determined, block 68' receives inputs from output terminals 56 and 60 while block 70' receives inputs from output terminals 62 and 58.

Each of the terminals 54, 58 and 62 are connected to inputs of a pulse $\Delta T$ measurement control circuit 76. A first output of block 76 is connected to periodically activate the pulse $\Delta T$ computers only when the receipt of a pulse is expected. A second output is connected to provide signals to the circuit 72. A third output is connected to provide an input to a commutation control circuit 78. The output of commutation control circuit 78 is used to provide an input to the previously mentioned commutation command generator 35 which has an output 33 connected to supply inputs to each of the commutation and decommutation networks. An output of block 72' in computer 66 is designated as 80. A coordinate transformation computer previously designated as 24 receives inputs from outputs 74 and 80 to summing amplifiers designated as 82 and 84 respectively. Each of these amplifiers receives three additional inputs in common from a two axis vertical attitude reference generator 86, a ship board reference point offset generator 88 and a coordinate converter 90. As will be further noted, the coordinate converter 90 receives an input from a beacon offset generator 92 and an input from a heading generator 94. The summing amplifier 82 is connected through a selectable averaging filter 96 to an input of a ship position display generally designated as 98. The amplifier 84 is connected through a selected averaging filter 100 to a second input of the ship position display 98. The first input provides a signal for the $y$ direction of indication while the second input provides the $x$ direction of indication.

Two selectable frequency local oscillators 102 and 104 shown in FIG. 4A supply inputs through manually controlled switches generally designated as 106 and 108 to a local oscillation commutator 110. The local oscillator commutator 110 receives a signal from the commutation command generator 35 to determine the position of the switch shown schematically as a two position switch. The switch output is provided to each of the converters 36.

FIG. 5 illustrates in more detail the beacon 16 of FIG. 2. An oscillator 111 having a frequency of $f_c$ provides a first input to a tuned modulator 112. A second oscillator 114 having a frequency of $f_m/2$ provides a second input to the tuned modulator 112. A pulse interval timer 116 supplies a signal through a blanking timer 118 to provide a third input to the tuned modulator 112 and also to provide an input to a pulse length timer 120. The output of pulse length timer 120 provides a fourth input to tuned modulator 112. The output of tuned modulator 112 is supplied through a driver 122 to an output power amplifier 124. Amplifier 124 supplies power through a transformer 126 to a projector hydrophone or other transducer 128.

As will be realized, the various circuitry described and to be described will be powered from some source which is not shown so as to simplify the drawings. In the case of the beacon it would have to be some type of battery or other portable power source while the ship board electronics can be supplied from the ship power sources.

Referring to FIG. 6A it will be noted that the waveform comprises three time periods in the output signal from the circuit of FIG. 5. A first time period is designated as $t_1$ and illustrates a modulated waveform. The time $t_2$ shows no output from the beacon 16 while time $t_3$ illustrates a pulse output having no modulation.

In FIG. 6B it will be seen that during time $t_3$ the output signal is basically $f_c$ or the basic oscillation frequency. During $t_1$ there are two frequency components in the output power spectrum due to the modulation, which components are $f_c - f_m/2$ and $f_c + f_m/2$. Thus by supplying various inputs to the modulator, the same circuitry can be utilized to provide different frequency outputs depending upon whether the modulator is modulated or not. The usefulness of this type of signal will be explained later.

FIG. 7 is illustrative of a slightly different coordinate transformation computer which may be used to replace computer 24 of FIG. 4 when there are two beacons one of which is movable. In this type of system, the fixed beacon is used as a reference and is the center of display while the movable beacon is shown as a point source on the display with respect to the center. Thus, relative position of the two units can be displayed. The computer of FIG. 7 can be used to directly replace computer 24 with only one additional connection. As shown, there are inputs 74', 80', 86' 94', and two outputs designated as 140 and 142 which correspond to the two outputs of the computer 24. One additional input is designated as 144 and is obtained from the commutation command generator shown as 35 in FIG. 4. The input 144 would be the same signal as supplied to local oscillation commutator 110. Input 74' is supplied through a controlled inverter 146 to a scaling and tilt compensation computer 148. Input 80' is supplied through a controlled inverter 150 to a scaling and tilt compensation computer 152. Each of the inverters 146 and 150 receive an input from terminal 144. Each of the inverters alternate between inverting and non-inverting conditions as controlled by the signal from terminal 144. The two computers 148 and 152 receive inputs from terminal 86'. Also, each of these computers supply outputs to a coordinate converter 154. The coordinate converter 154 receives an additional input from terminal 94' and supplies two outputs to two selectable averaging filters 156 and 158. These filters supply outputs to the output terminals 142 and 140 respectively and would be connected to provide inputs to a position display indicative of the $y$ and $x$ directions of one beacon with respect to the other beacon.

In FIG. 8, a representation of a ship 175 is shown having two hydrophones 177 and 179 corresponding respectively to hydrophones 12 and 14 of FIG. 2. Extending from the bottom of the ship 175 is a drill string 181 having an array 182 at the lower extremity thereof containing a first hydrophone or transducer 183 and a second hydrophone or transducer 185. Also attached to the array 182 is an echo ranging sonar transducer 187 and a vertical reference unit 189. On the ocean floor is a unit containing a well-head connector 191 and beacons 193 and 195. Beacons 193 and 195 correspond respectively to beacons 16 and 17 of FIG. 2.

In FIG. 9, reference numerals are the same as in FIG. 8 where practical. Thus, there are beacons 193 and 195 supplying signals to a hydrophone array comprising hydrophones 183 and 185 along with a hydrophone or transducer 197 which was not visible in FIG. 8. Each of these hydrophones supply their signals to a junction box 199 which is connected by a plurality of cables to an echo ranging sonar circuit 201 and to an acoustic position reference system 203 which includes both signal processing and display. The previously mentioned transducers and junction box are contained within a suspended guidance unit or array block 205. The unit 205 also includes the echo ranging sonar transducer 187 and a vertical reference block 189. The vertical reference could take the form of various and sundry electronic or mechanical devices such as a gyroscope or merely convection tubes. The echo ranging sonar block 201 contains a transmitter 207 which supplies signals through a transmit/receive switch 209 to the transducer 187. Signals are received from transducer 187 through the transmit/receive switch 209 to a receiver 211. Both the receiver and the transmitter supply information to a range measurement circuit 213 which provides outputs to a display 215. The multi-conductor cable from block 205 is connected to a multiple-pole 2-position switch 217 within block 203. Three of the poles are connected to receivers 219, 221 and 223 corresponding to the receivers 18, 20 and 30 in FIG. 4A. These receivers each have an output connected to a phase/time difference computer 225 which has two outputs $\theta_x$ and $\theta_y$ connected to a coordinate transformation computer 227. The computer 227 supplies outputs $\theta_x$ and $\theta_y$ to a display unit 229 which contains an indication 231 that the target is not centered with respect to the hydrophone array. In FIG. 9, there is also shown an additional hydrophone 233 which cannot be seen on ship 175 which is connected to one of the inputs of switch 217 along the hydrophones 177 and 179. As shown the suspended guidance unit is connected to the receivers but in the alternate position of switch 217, the ships hydrophones would be connected. Also, as shown, the vertical reference unit 189 from the suspended guidance unit 205 is connected to supply information to computer 227. In the alternate position, vertical reference information for the ship would be obtained from a shipboard vertical reference circuit 235 which is connected to switch 217. In addition, there are a plurality of oscillators 237 which supply inputs to the receivers 219, 221 and 223. Oscillators 237 correspond to units 102 and 104 in combination with 110 in FIG. 4A.

OPERATION

For the initial discussion of operation of FIG. 2, it will be assumed that a plane defined by the hydrophones is level and the beacon 17 will be momentarily ignored. FIG. 2 as shown illustrates the basic system for obtaining an indication as to the angle that a line from the hydrophones to the beacon 17 makes with a line vertical to the hydrophone array. As shown, this information is being obtained only for the $x$ axis coordinates but the same computations would be used for the $y$ axis coordinates.

The underwater acoustic beacon 16 transmits a unique signal which is received by the array of hydrophones 10–14.

The characteristics of the beacon signal are uniquely chosen to permit very accurate measurement of the relative time of arrival of this signal at each of the hydrophones mounted on the vessel. While more than three hydrophones can be used, the output indication would not be any more exact than is presently obtained.

The signals received by the hydrophones 12 and 14 are first amplified and then demodulated in the receivers 18 and 20 respectively. The difference in the time of arrival of the beacon signal at the individual hydrophones 12 and 14 is then measured in the phase/time difference computer 22. Under the assumption that the hydrophone platform is level, the following formulas illustrate the derivation of position information from the measured time differences for the $x$ direction.

(1) $\qquad (c/d_x)t_x = \sin \theta_x$ where $c$ equals velocity of sound at the hydrophones.

(2) $\qquad (c/d_x)1\omega_m\Delta\sigma = \sin \theta_x$ where $\omega = 2\pi f_m =$ modulation frequency at the phase is measured. Further, as will be noted from the drawing, $d_x$ is the distance between hydrophones 12 and 14 while $\theta_x$ is the angle between a vertical line and a line from a midpoint between hydrophones 12 and 14 and the beacon. Further, $c\Delta t_x$ is the distance that the sound must travel to reach hydrophone 14 after it reaches hydrophone 12.

(3) $\qquad x_b/z_b = \tan \theta_x$ where $z_b$ is the vertical distance from the hydrophone to the beacon. If the system constant $k_x$ is defined as (4) $\qquad k_x = c/d_x(1\omega_m)$ and (5) $\qquad k_x \Delta \sigma_x = \sin \theta_x$ For small angles $\theta_x$, $\sin \theta$ is essentially equal to $\tan \theta$ and is essentially equal to the angle $\theta$ itself. Therefore, (6) $\qquad x_b/z_b = k_x \Delta \sigma_x$ or (7) $\qquad x_b = z k_x \Delta \sigma_x$ As may be observed from the above equations, the angle of arrival of the signal with respect to the array of hydrophones is determined by measuring the time or phase difference of the beacon signals arriving at the hydrophones. It will be realized by those skilled in the art that by using externally provided inputs of sound velocity and fixed system constants, the system will compute the distance, in the horizontal plane, from the beacon 16 to the ship, in terms of a fraction of water depth, $x_b/z_b$. If the depth of water is known, the displayed information may be directly in the form of the distance $x_b$ in feet.

Although phase/time difference systems (hyperbolic systems) in general require more than nominal computation capability for position determination in cartesian coordinates, for directions near the perpendicular bisector of the base line very simple mechanization of the computation is possible. Thus, for beacon offsets of up to 20 percent of the water depth, the easily mechanized approximation formula shown above approximates the exact calculation with an error of less than 0.5 percent of the water depth. At larger offsets, a digital computer incorporated into the system may be used to solve the more precise expressions for position in cartesian coordinates.

The computations to solve the Formulas 1–7 are implemented in computer 24 and then displayed on position display 28.

It may now be assumed that the array of hydrophones does not remain level. The attitude of these hydrophones may be measured by the vertical reference unit 26 and the measured time difference, proportional to $\theta$, will be approriately corrected in computer 24.

So far FIG. 2 has been described without reference to beacon 17. If beacon 17 is included and if it has a different frequency or different code then beacon 16, and further if the receivers are alternately switched to receive one code and then the other, the position display information would be the average point between the two beacons 16 and 17. If the distance $x_b'$ is the same as $x_b$ there will be an indication on the position display 28 that the hydrophones 12 and 14 are exactly over a point midway between becon 16 and 17. This type of information might be useful in a situation where the beacon cannot be mounted directly upon the reference point. Such a reference point might be a well head where it is desirable to position a drill bit. Obviously, a beacon could not be mounted exactly where a drill bit should be positioned. Although an input could be placed into computer 24 to provide an offset for one beacon so as to provide a display posiiton which indicates that the ship is directly over a precise point a predetermined distance away from the beacon, additional information is necessary in the form of the exact position of the ship with respect to a north reference or some such other reference in order to exactly position the vessel 15. With the utilization of two beacons, the midpoint can easily be determined for the $x$ direction and the $y$ direction will automatically be provided from either one or both of the beacons 16 and 17 when the hydrophones 10 and 12 are positioned exactly over the beacons 16 and 17 in the $y$ direction.

Reference will now be made to FIG. 5 for a description of operation of the beacon. The oscillator 111 provides a high frequency $f_c$ signal to the input of modulator 112. A stable oscillator 114 provides a low frequency $f_m/2$ to the other input. During the time period $t_1$ as indicated in FIG. 6A, the modulator 112 operates as a conventional double balanced modulator and the output of the beacon is as shown for this time period. In other words, it consists of two essentially single frequency components at frequencies $f_c+f_m/2$ and $f_c-f_m/2$. This is indicated in FIG. 6B. The action of the modulator during this time period is such as to almost entirely suppress any signal output at the frequency $f_c$. While any suitable frequencies may be used, one embodiment of the invention utilized 40 kHz. for oscillator 111 while oscillator 114 operated at 72 Hz.

The output signal of the modulator 112 is amplified by driver 122 and input power amplifier 124 and applied through matching transformer 126 to the acoustic projector 128. The transducer 128 converts the electrical signal energy to acoustic energy for transmission of the beacon signal through the water to the hydrophones of FIG. 2. Transducer 128 operates as a basically semi-directional source, transmitting a relatively uniform signal level in all upward directions. The signal level in the downward direction is of no consequence but is usually considerably lower. The circuitry of FIG. 5 is designed to operate in a highly linear manner thus providing undistorted output signals.

At the end of time period $t_1$, determined by the pulse interval timer 116, the pulse interval timer generates a blanking pulse of duration $t_2$. The length of the blanking pulse is determined by circuit constants in blanking timer 118. During the interval $t_2$, the blanking timer applies a signal to the modulator 112 which cuts off any signal output from the modulator. Thus, there is no output signal transmitted from the beacon during time period $t_2$.

At the end of time period $t_2$, the pulse length timer 120 is actuated. The pulse length timer 120 generates a signal for a period $t_3$, which when applied to the tuned modulator results in the output of a short pulse signal at frequency $f_c$. To provide maximum output power during this pulse, the modulator 112 is adjusted to provide a peak signal level approximately 2½ times the peak level of the single side band signal transmitted during $t_1$. At the conclusion of interval $t_3$, the new interval $t_1$ begins and the transmission of the double side band signal for a period $t_1$ is again initiated. One embodiment of the invention contained the following division of time periods. $T_1 = 78.8$ milliseconds, $t_2 = 5$ milliseconds, and $t_3 = 1.6$ milliseconds.

With the circuitry described above, the successive generation of (1) two precisely spaced single frequency components, (2) a period of silence, and (3) a short pulse at a single frequency, for example a frequency half way between the two single frequency components is obtained.

Referring now to FIG. 4, it will be noted that the three hydrophones are installed so that lines connecting the centers of adjacent hydrophones, such as 10 and 12 and 12 and 14 which are called base lines, form a right angle. The hydrophones are installed in a horizontal plane below the bottom of the vessel or other platform. The horizontal axes of a coordinate system used to determine the ship's position are the perpendicular bisectors of the base lines in the horizontal plane with the positive directions as shown. The vertical $z$ axis is perpendicular to the horizontal plane and is positive downwards.

In a downward position the hydrophones are essentially non-directional having essentially uniform receiving sensitivity in all downward directions. In the upward direction the hydrophones 10–14 have very little response so as to prevent surface and ship generated noise and signal reflections from entering the shipboard system.

As is well known to those skilled in the art, the acoustical signals received by the hydrophones are converted into electrical signals of identical characteristics in the time and frequency domains.

The signals received by hydrophones 10–14 are processed by receivers 18, 20 and 30 to recover, from the two sidebands of the essentially continuous modulation signal, a signal at the difference frequency of the sidebands. This signal will be referred to hereinafter as the "wave signal." Further, pulse signals such as provide in timer period $t_3$ are also received by the above mentioned receivers. The wave signal and pulse signal are recovered by separate processing circuitry as will be described. Thus, each receiver produces two outputs, an essentially continuous wave signal and a periodic pulse signal. The receivers also incorporate circuits for selection of a signal from a particular beacon by tuning the receiver to one of the set of predetermined frequency bands. The outputs of the receivers are connected to the phase/time difference computers 64 and 66 in such a manner that the signals received by hydrophones 12 and 14 provides one set of inputs to the $x$-phase/time computer 64 and the signals received by hydrophones 10 and 12 provide a set of inputs in the $y$ direction to computer 66. The computers 64 and 66 measure by separate circuitry, the phase difference between two wave signal inputs and the time difference between two pulse signal inputs. In computer 64, the phase difference is measured by computer 68 while the time difference is measured by the computer 70. For very small time differences, less than half the cycle of the wave signal, both these measurements yield the same information. The phase difference measurement on the wave signal provides this information with a very high degree of accuracy, whereas the time difference measurement on the pulse signal is more approximate—"coarse"—and may be as inaccurate as approximately one quarter to half of a cycle of the wave signal. As the time difference increases, due to the periodic nature of the wave signal, the phase difference measurement can however determine only that part of the time difference which is proportional to a fraction of a cycle of the wave signal. That is, if the phase difference between the received signals is $2n\pi + \Delta\phi$ radians, where $n$ is an integer, a phase difference computer can inherently only determine $\Delta\phi$ since the phase difference in this case will look exactly the same regardless of the number $n$. The pulse signal outputs from the receivers are processed in the pulse/time computer to measure a coarse time difference which essentially determines what the number $n$ is. The phase difference measurement on the wave signals and the time difference measurement on the pulse signals are then combined by appropriate control logic in the output circuit 72 of the phase/time computer to provide a single, highly accurate measurement of the total difference in the time of arrival of the signal at the hydrophones.

Further details as to the operation of the phase/time difference computer may be obtained from a copending application No. 655,375 in the name of Dan Kusaka et. al. filed on July 24, 1967 and assigned to the same assignee as the present invention.

The output of computer 64 is then a signal proportional to the total time difference in arrival of the signal at hydrophones 12 and 14. Precisely defined, this time difference is proportional to the sine of the angle between the radius vector from the origin of the shipboard coordinate system to the beacon and the $yz$ plane (perpendicular to the $x$ axis through the origin of the coordinate system). By identical operations in the $y$-phase/time computer 66 on signals received by hydrophones 10 and 12, the computer 66 produces an output signal which is proportional to the sine of the angle between the radius vector from the origin of the coordinate system to the beacon and the $xz$ plane. As was previously mentioned, computers 64 and 66 use identical circuitry. Since the desired information is the two dimensional relative horizontal displacement of the vessel 15 and an underwater reference point, certain coordinate transformation computations are necessary to convert the output signals of the phase computers to the desired signal form suitable for the display.

For small angular displacement, these transformations and computations are implemented using well known approximations in a straight-forward manner in the coordinate transformation computer 24. For larger displacements the exact form of the position equations can be solved by a general purpose or a special purpose computer incorporated into the system. Such a computer is not shown specifically in the drawings of this invention since it would not be a part of the invention.

Since the time differences are measured with respect to the plane of the hydrophones which are normally attached to a rolling and pitching vessel, to derive position information in a horizontal plane, corrections have to be introduced to convert the measured quantities to what would be observed if the plane of the hydrophones were level. Thus the tilt of the vessel (deviations from a level attitude), i.e. the roll and pitch angles of the vessel, are determined by a two-axis vertical attitude reference 86 (such as a vertical gyro) and this information used to correct the measured quantities. The precise tilt-compensation operation is that of transforming the measured angular coordinates of the beacon into a coordinate system centered at the same origin but with the $x$ and $y$ axes horizontal in the same vertical plane as the original $x$ and $y$ axes.

In many applications where position reference is required, the operations for which position reference is required can only be performed under small or moderate roll and pitch of the vessel. Thus the roll and pitch angles encountered in practical use of position reference systems rarely exceed 10 degrees. For such small angles the required compensation for the tilt of the hydrophone array can be implemented simple by adding a quantity linearly proportional to the roll or pitch angle to the measured position in $x$ or $y$ coordinates. This is accomplished by summing the appropriate output of the vertical attitude reference system 86 with the appropriate phase/time computer output in the summing amplifiers 82 and 84.

Compensation for possible offset of the center of the coordinates used for measurement from a desired coordinate system origin on board ship as suggested in connection with the explanation of FIG. 2 is provided by generator 88. These offsets can easily be generated in block 92 as DC bias voltages and added to the position information in the summing amplifiers 82 and 84. Further, as mentioned in connection with FIG. 2 it is possible that an offset from the beacon might be desirable in certain applications such as a wellhead where it is not possible to install the beacon in the center of the wellhead. The computer 24 therefore includes circuitry such as 92 for providing this offset information. The coordinate converter 90 utilizes information from both the beacon offset generator 92 and from the heading generator 94 to provide the beacon offset information. However, it will often be simpler to utilize two beacons as alternately shown in FIG. 2 to obtain information as to an offset rather than require the additional heading information.

The mathematical operations for the coordinate transformation computations may be easily generated by one skilled in the art where only one beacon is utilized and an offset is desired but these mathematical formulas will not be presented here. The signals are smoothed by averaging filters 96 and 100 to remove short term fluctuations due to noise and other factors such as computation. The averaging time of these filters is selectable for display of the ship's dynamic motion or its average position. The display 98 is given by the outputs of computer 24 in a so called plan position display with a coordinate system such as shown in FIG. 4B. This display may be a CRT, an *xy* recorder or some other display. The output signals can also be made available for recording or for providing a position reference to an automatic control system for controlling the position of the vessel with respect to the chosen bottom reference point.

As previously indicated, all the receivers are identical in physical form. Thus, the description of operation of receiver 20 will suffice for the description of operation of the other two receivers. A signal is received from hydrophone 14 by input commutator 32. As shown, the switch in commutator 32 is such that the signal is supplied to delay prefilter and amplifier 34 and then supplied to frequency converter 36. In the converter 36 the signal is mixed with a signal from one of the oscillators 102 or 104 and the output is an IF frequency. This IF frequency is filtered by filter 38 and supplied to amplifier and detector 40 and the pulse decommutator 42. Thus far, in the receiver the circuitry is used to pass both the pulse and the modulated signals. If the signal is a pulse, and is applied to amplifier and detector 40, it will not pass through the band pass filter 44. However, a modulated wave will be detected and pass through the bandpass filter 44 which will pass one of the side bands and then the signal is supplied to the clipper 46. At this point, it is merely a digital signal in the form of a series of pulses. It is then supplied through the wave decommutator 48 to the wave phase computer 68.

A wave signal from filter 38 will pass through the pulse decommutator 42 and the pulse vertifier and detector 52 but will not affect the pulse $\Delta t$ at computer 70 since it is inactivated except for a short period of time corresponding to $t_3$ by the pulse $\Delta t$ measurement control circuit 76. Thus, only the pulses which arrive at an expected time are passed through the pulse decommutator 42 and the pulse verifier and detector 52 to actuate the pulse $\Delta t$ computer 70. These pulses are passed through the logic and output circuit 72.

For the purposes of this specification, it is enough to state that the signals are commutated and decommutated so that individualistic errors in processing, such as errors found in the filters and amplifiers, are averaged to zero by sending a signal such as that obtained from hydrophone 14 through each of the receivers in a predetermined fashion so that it is passed by each receiver the same amount of time. Further information as to the operation of the commutation and decommutation system may be found in a copending application in the name of Bob Clapham, et al. Ser. No. 655,663, filed July 24, 1967, and assigned to the same assignee as the present invention. The commutation and decommutation system is not a necessary part of the invention and merely provides increased accuracy over an uncommutated system.

Going back to the prefilter 34, it should be noted that this prefilter rejects interferring signals and noise outside the frequency band in which any beacon signals are located. The phase characteristics of the prefilter 34 are chosen so as to provide a uniform delay for all frequencies of interest. Thus, the receiver may be operated at the frequencies transmitted by different beacons without adjustment. The amplifier which is a part of block 34 increases signal levels for subsequent processing. When signals are being received from only one beacon, the frequency converter receives only one signal from one of the oscillators 102 or 104. However, when more than one beacon is supplying signals of more than one frequency, the commutator 110 alternates between signals from oscillators 102 and 104. This commutation is synchronized with the wave and pulse commutators and decommutators since all the commutation signals are obtained from command generator 35. The IF filter 38 is centered at the intermediate frequency of the receiver and has a bandwidth sufficient to include the modulation of a single beacon. This filter rejects noise and beacon signals other than the one from the desired beacon. As in the case of the prefilter 34, the phase characteristics of the IF filter are chosen to provide a uniform delay at all frequencies of interest. The amplifier detector 40 amplifies the signals from the IF filter and by means of conventional automatic gain control circuitry normalizes the wave signal to a constant level. As is the case of most detection circuitry, the detection operation provides square-law output to recover from the wave signal a signal at the difference frequency, $f_m$ of the two side bands transmitted by the beacons such as 16 or 17. The bandpass filter 44 is centered at the frequency $f_m$ and passes signals near this frequency while rejecting noise and interferring signals at other frequencies. This filter is chosen so as to provide constant phase shift at frequencies near the $f_m$ frequency. Minor frequency deviations in the beacon signal will thus not contribute phase errors to the phase difference measurement.

The hard clipper 46 normalizes the signal amplitude to binary values. Thus, the output of the clipper 46 is in one state when the input signal has a positive amplitude and is in another state when the input signal has a negative amplitude. During the time period $t_1$, the pulse verification logic 52 senses the presence of the continuous wave modulation and disables the output of the pulse detector unit also contained within the block 52. When the continuous wave modulation ceases, and no signal is received for approximately the time period $t_2$, the logic senses this situation and enables the pulse detector for a chosen period of time approximately equal to $t_3$ beginning near the end of time period $t_2$. When a pulse exceeding a chosen amplitude threshold is received during the time the pulse detectors 52 are enabled, the pulse detector produces an output pulse at the exact time of arrival of a chosen part of the pulse. This part may be the leading edge. However, for higher timing accuracy and insentitivity to signal amplitude variations, the first peak of the detected pulse is chosen. Thus, the pulse detector is gated on to detect a pulse from the beacon only during the time that a pulse is actually expected and the presence or absence of the continuous wave modulation is used to determine when a pulse may be expected. This method of operation minimizes the number of spurious pulse detections that the pulse detector may produce.

The generation of control signals necessary for the commutation portion of this circuit is performed in the pulse measurement control circuit 76. This circuit receives inputs from the pulse verification and detector circuits 52 in all receivers. It senses the presence of the dead time $t_2$ preceeding a pulse in any receiver in the arrival of a pulse. Commutation timing is then synchronized with the arrival times of the pulses so that commutation does not take place during the actual time that a pulse is being detected. The pulse measurement control circuit 76 also senses the time arrival of the first pulse into each phase computer 68 and generates reset to zero time difference commands to the phase computer 68. Moreover control 76 checks for the presence of all three pulses and transmits a validation signal to the phase computer. Without the validation signal, the output of the phase computer 64 is not updated since missing one of the pulses which would result in erroneous data.

While the system is not limited to any particular commutation cycle, one embodiment of the invention utilized a 240 millisecond complete commutation cycle. When two beacons of different frequencies are used, wherein either both of the beacons are situated at firm points, so that the desired reference point is midway between, or in the situation where one of the beacons is movable and the other is used as a reference point, the commutation between the two oscillators 102 and 104 produces a measurement interval of 480 milliseconds. This is enough faster than the change of vessel position so that essentially simultaneous measurement of both positions is obtained.

When one of the beacons is movable, the circuitry of FIG. 7 must be inserted in place of computer 24 in FIG. 4. This system operates basically in a two beacon mode similar to that described for the complete system of FIG. 2 in that alternate measurements are made of the coordinates of the fixed beacon and the moving beacon with respect to the ship board coordinates as defined by the array of hydrophones 10–14. By computations implemented in the coordinate transformation computer of FIG. 7, the system converts this measured information into the coordinates of the moving beacon with respect to the fixed beacon in a north oriented cartesian coordinate system. The position information on the moving beacon is referenced to the fixed beacon in a coordinate system with the origin thereof is coincident with the fixed beacon and the axis parallel to the ship board coordinate system by subtracting the $x$ coordinate of one beacon from the other and the $y$ coordinate of the first beacon from the second. By using the ship's heading information furnished by heading reference generator or compass 94, these coordinates are then transformed to a north referenced cartesian coordinate system with its origin also at the fixed beacon. The result is then the determination of the position of the moving beacon with respect to the fixed beacon in a fixed, north referenced cartesian coordinate system.

Thus, the outputs of each of the phase $\Delta t$ computers 64 and 66 are supplied respectively to the controlled inverters 146 and 150. These signals alternately represent the difference in the time of arrival of the signals from the stationary and the moving beacons as referenced to the ship board coordinate system defined by the hydrophone array.

To implement the subtractions of the moving from the fixed beacon coordinates in the $x$ and $y$ directions to obtain a new $x$ and $y$ coordinate, the computer of FIG. 7 computes the outputs obtained from terminals 74' and 80' in computers 148 and 152 after being processed by inverters 146 and 150. The two inverters are alternately actuated to positive or negative outputs depending upon which beacon the signals are being received from. This automatically produces the subtraction process. The computers 148 and 152 then correct the time difference for the tilt of the vehicle and scale them to the proper scale factor in percent of water depth or feet. As will be realized by those skilled in the art, the computers 148 and 152 can be replaced by amplifiers as shown in FIG. 4 for small values of vessel tilt and where the distance $x_b$ or $y_b$ is less than 20 percent of the distance $z$. These signals are then supplied through the coordinate converter 154 to averaging filters which operate in a manner similar to that shown in FIG. 4 before being supplied to a positional display unit.

As will be realized, even with the use of FIG. 7 in place of computer 24, the output can be utilized to obtain the position of the vessel with respect to either the fixed or moving beacon by merely adjusting switches 106 or 108 so that both receive the same frequency signal from the same beacon and removing the control signal from inverters 146 and 152. In view of the previous information, the explanation of operation of FIGS. 8 and 9 is fairly obvious. However, it may be stated that the ship 175 is positioned substantially over the wellhead 191 through the use of the shipboard hydrophones 177, 179 and 233. Once this is accomplished, the drill string 181 is lowered and the ship's positioning system is switched to the hydrophones on the array 182. Then, the ship 175 is positioned somewhat more accurately through the information obtained from the hydrophones on array 182. The distance from the array to the wellhead is obtained by the echo ranging sonar utilizing transducer 187. Thus, accurate information is obtained to determine the distance for the drill string to be lowered and how much and which way the ship should be moved in order to accomplish re-entry.

The echo ranging sonar of FIG. 9 is very similar to most distance measuring devices and merely utilizes the transmission of a pulse from transducer 187 to the nearest object and takes the reflected signal through the receiver to a range measurement device which had previously received the transmitted signal. The time between transmission nad reception provides an indication of distance. Since the wellhead 191 is presumably closer to the transducer 187 than any other portion of the ocean floor or of the device upon which the wellhead 191 is mounted, the first return signal will be obtained from the wellhead. At higher distances, it makes very little difference whether the echo signal is returned from the wellhead or it is returned from the floor of the ocean. This is because the distance is great enuogh that a few feet of error will not substantially affect the accuracy of the horizontal distance information.

When operating the system of FIG. 9, the multi-pole switch 217 is normally in the lower position for operating the display with respect to the ship's hydrophones and in the upper position when utilizing the suspended guided unit array 205. Since the block diagram of FIG. 9 is substantially the same as the block diagram of FIGS. 4A and 4B with the exception of the echo ranging sonar, further discussions as to operation are believed unnecessary and will not be provided.

I claim:

1. In direction determining apparatus of the class described comprising, in combination:
    a first submarine beacon for transmitting repetitive combinations of acoustic signals which successively constitute a relatively long period of a first frequency modulated by a second frequency, a shorter period of no output signal and an even shorter period of output at only the first frequency;
    a plurality of sound receivers for receiving the acoustic signals transmitted by said first beacon;
    time detection means connected to said sound receivers for providing a coarse output indicating the approximate difference in time of arrival of an alternating signal from said first beacon to the nearest full cycle;
    phase detecting means connected to said sound receivers for providing a fine output indicating the difference in time of arrival of an alternating signal from said first beacon to a fraction of a cycle; and
    means connected to said detection means for providing an output indicative of an angle between said first beacon and a line normal the sound receivers from the difference in time of arrived outputs.

2. Apparatus as claimed in claim 1 wherein commutation means periodically and repeatedly switch the received signals for processing in different ones of said plurality of receivers to substantially elimate errors arising from different characteristics in different receivers.

3. The apparatus claimed in claim 1 further including:
    a second submarine beacon for transmitting repetitive combinations of acoustic signals which successively constitute a relatively long period of a third frequency modulated by the second frequency, a shorter period of no output signal, and even a shorter period of output at only the third frequency; and
    computer means in said last named means for receiving the signals from said beacons and providing an output indicative of the relative positions of the vessel and a reference position intermediate said beacons.

4. Apparatus as claimed in claim 3 wherein:
    said sound receivers are relatively situated on three corners of a rectangle; and
    the reference position is midway between said beacons.

5. Apparatus as claimed in claim 3 wherein the computer means includes:
    three receiver circuits for converting the acoustic signals to electrical signals;
    two comparators for comparing the time differential between signal reception at adjacent sound receivers; and display means for graphically illustrating the relative positions of the vessel and the reference position.

6. Direction finding apparatus for indicating the direction and relative horizontal distance from a reference point to receiving apparatus comprising, in combination:

sound source means in a known positional relationship with the reference point for transmitting signals which contain frequency components of at least two distinct frequencies in which the waveform is periodically representative of a pulse of substantially a single frequency;

first, second and third transducers for receiving acoustic signals, adjacent transducer pairs being mounted at right angles to each other;

first, second and third receivers connected respectively to corresponding transducers wherein each receiver includes in consecutive order from input to output a first filter, a frequency converter, an intermediate frequency filter, an agc and detector circuit, a bandpass filter and clipper for producing a first output signal, and wherein each receiver additionally includes a pulse verifier and detector circuit for producing a second output signal only during the expected arrival time of the pulse waveform;

a first difference computer for receiving the first and second output signals from said second and third receivers and providing a y coordinate output signal indicative of the time difference of arrival of acoustic signals at the second and third receivers, said first difference computer including a pulse time difference circuit for providing a coarse time indication from the second output signals received thereby;

a second difference computer for receiving the first and second output signals from said first and second receivers and providing an x coordinate output signal indicative of the time difference of arrival of acoustic signals at the first and second receivers, said second difference computer including a pulse time difference circuit for providing a coarse time indication from the second output signals received thereby; and output means for combining the x and y coordinate signals to provide a relative distance indication.

7. Apparatus as claimed in claim 6 wherein each of said receivers also includes commutation and decommutation means for periodically interchanging the signal path from said transducers to said computers to effectively average errors in phase shift in receiver circuitry to zero.

8. Apparatus for remotely monitoring the joining of two objects at least one of which is movable with respect to the other comprising, in combination:

first means including first and second spaced apart sound transmitting means, each sound transmitting means transmitting signals which contain frequency components of at least two distinct frequencies in which the waveform is periodically representative of a pulse of substantially a single frequency, at least one frequency component produced by said first sound transmitting means being distinguishable from the corresponding frequency component produced by said sound transmitting means;

second means for placement continguous said first means, said second means including first, second, and third sound receiving means;

x coordinate computing means connected to two of said sound receiving means for providing an output x displacement signal indicative of the vector displacement of said first means with respect to said second means in a first direction, said x coordinate computing means including a pulse time difference computer for providing a time indication from pulse portions of the waveforms received by said first and second sound receiving means from one of said sound transmitting means;

y coordinate computing means connected to the remaining sound receiving means and to one of the previously connected sound receiving means for providing an output y displacement signal indicative of the vector displacement of said first means with respect to said second means in a second direction perpendicular to said first direction, said y coordinate computing means including a pulse time difference computer for providing a time indication from pulse portions of the waveforms received by said second and third sound receiving means from one of said sound transmitting means; and display means connected to said computing means for receiving output signals therefrom and for providing an indication of relative displacement between said first and second means.

9. Apparatus as claimed in claim 8 comprising in addition propulsion means attached to at least one of said first and second means for moving said means to reduce the x and y displacements to a minimum.

References Cited

UNITED STATES PATENTS

| | | | |
|---|---|---|---|
| 1,961,767 | 6/1934 | Key | 340—6X |
| 2,515,472 | 7/1950 | Rich | 340—16X |
| 3,005,200 | 10/1961 | O'Meara | 343—123 |
| 3,130,385 | 4/1964 | Galloway | 340—6 |
| 3,218,553 | 11/1965 | Peterson et al. | |
| 3,270,345 | 8/1966 | Schauffler | 340—6X |
| 3,339,204 | 8/1967 | Rail | 343—113 |
| 3,383,651 | 5/1968 | Koblick | 340—6 |

FOREIGN PATENTS

| | | | |
|---|---|---|---|
| 836,687 | 6/1960 | Great Britain | 342—120 |

OTHER REFERENCES

Ragland, Ocean Science & Ocean Engn., vol. 2, 1965, pp. 1145–1157 and 1159.

RICHARD A. FARLEY, Primary Examiner

U.S. Cl. X.R.

340—3, 5; 343—120, 113